Figure 1:
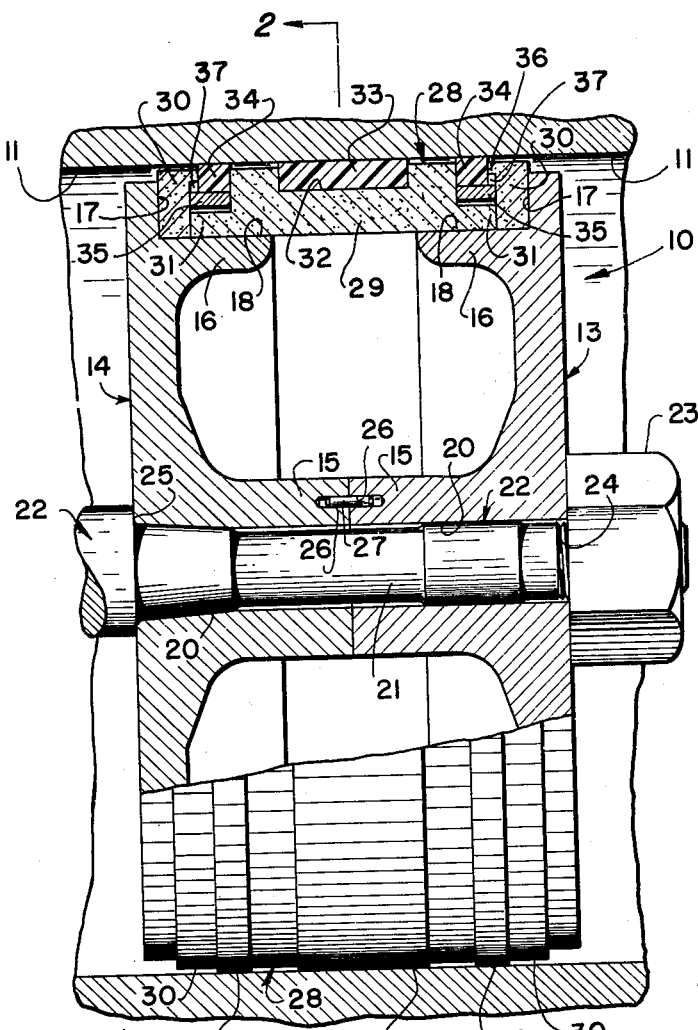

Sept. 22, 1964  J. NAAB  3,149,543
NON-LUBRICATED PISTON
Filed March 4, 1963

INVENTOR.
JULIUS NAAB
BY
ATTORNEY

United States Patent Office 3,149,543
Patented Sept. 22, 1964

3,149,543
NON-LUBRICATED PISTON
Julius Naab, Corning, N.Y., assignor to Ingersoll-Rand Company, New York, N.Y., a corporation of New Jersey
Filed Mar. 4, 1963, Ser. No. 262,517
8 Claims. (Cl. 92—155)

This invention relates to pistons and more particularly to pistons of the non-lubricated type for air or gas compressors, engines, or analogous mechanisms of the reciprocating type.

Non-lubricated or self-lubricated pistons are employed where contamination of the gaseous fluid by lubricants is to be avoided. A wide variety of non-lubricated pistons has been designed, some of which have employed carbon wear and seal rings such as shown in the U.S. Patent to Payne, No. 2,768,037, and the U.S. Patent to Naab, No. 2,774,639. Various other designs have included piston rings consisting of a metal backing having an outer layer of non-metallic material of self-lubricating characteristic, such as tetrafluoroethylene, commercially known by the trademark Teflon, as exemplified in the U.S. Patents to Fleming, No. 2,807,511, and Howe, No. 3,039,834. While these various piston wear and/or seal rings provide self-lubricating and/or resistance to wear characteristics, pistons having such wear and/or seal rings are unsuitable for use in compressors, pumps, or the like for compressing fluid of a highly combustible nature, such as boron trifluoride, because metal to metal contact and possible sparking will occur when the carbon ring and/or Teflon material wears away before an operator becomes aware of the fact that the piston wear and/or seal rings have worn sufficiently to require replacement. This metal to metal contact is likely to produce a spark which will ignite the fluid, causing damage to the compressor and/or the area surrounding the compressor and injury to plant personnel.

Accordingly, it is an object of the present invention to provide a non-lubricated piston suitable for use in a mechanism for handling combustible fluids where the danger of accidental combustion of the fluid therein is substantially minimized.

Another object of this invention is to provide a non-lubricated piston wherein metal to metal contact between the piston and cylinder bore is prevented after the wear and/or seal rings have achieved maximum wear.

It is, therefore, contemplated by the present invention to provide a novel non-lubricated piston comprising a sleeve of non-metallic material, as for example graphitized carbon, disposed in a peripheral groove formed in the piston body. The sleeve is dimensioned so that it extends slightly less than the full length of the piston body and projects a substantial distance beyond the peripheral surface of the piston body. The sleeve is adapted to receive a plurality of non-metallic seal rings of self-lubricating and high wear resistance characteristics, such as Teflon, and a non-metallic wear ring also of material having self-lubricating and high wear resistance characteristics. The seal rings may be biased outwardly by suitable means to project beyond the surface of the sleeve and into engagement with the surface of the cylinder bore. The wear ring is also dimensioned to project beyond the peripheral surface of the sleeve and to engage the surface of the cylinder bore. The piston body is preferably constructed of two abutting sections which are held together as a unitary member on the piston rod between a nut threaded on the piston rod and a shoulder formed on the piston rod. This piston body construction and means for securing the body sections together also serve to secure the sleeve to the piston body and provide a quick and easy means for replacing the sleeve and/or seal rings.

In operation of the piston according to the present invention, the excessive wearing away of the seal rings of self-lubricating character and/or the wear ring does not result in the metal piston body coming into contact with the metallic wall of the cylinder bore so that sparking will not occur, and thus the danger of combustion of the fluid therein is obviated.

Figure 2:
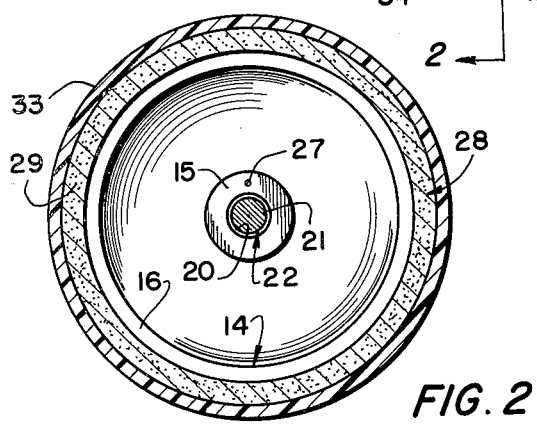

The invention will be more fully understood from the following description when considered in connection with the accompanying drawings in which:

FIG. 1 is a longitudinal view in section of a non-lubricated piston according to this invention disposed for reciprocation within a cylinder bore, and FIG. 2 is a transverse sectional view taken along line 2—2 of FIG. 1 on a substantially reduced scale.

Referring now to the drawings, 10 generally designates a piston according to the present invention disposed within a cylinder bore 11 of a mechanism, such as a compressor or pump. Piston 10 comprises a body constructed of two similar disc-shaped sections 13 and 14 disposed in abutting relationship. Sections 13 and 14 each has an axially extending hub or boss 15 and an annular flange 16 spaced inwardly of the periphery of the section to form a shoulder 17 and an annular seat 18. Flange 16 extends coaxially with boss 15 but is shorter in length than the boss so that when the sections are joined together as a unitary assembly, the distal ends of flanges 16 of the respective sections 13 and 14 are spaced from each other. Sections 13 and 14 have registered central bores 20 which are adapted to receive therethrough the reduced diameter portion 21 of a piston rod 22.

To secure sections 13 and 14 of the piston body to piston rod 22, a nut 23 is turned upon the threaded end 24 of reduced diameter portion 21 to thereby force sections 13 and 14 in tight abutment against each other and against an annular shoulder 25 formed on the piston rod by reduced diameter portion 21. To prevent the possibility of relative rotative movement between sections 13 and 14, the abutting end faces of each boss 15 of the sections are provided with a hole 26 extending parallel to the axis of bore 20. Each of the holes 26, when in register, is adapted to receive a portion of a pin 27.

The piston 10 is provided with an annular sleeve 28 which comprises a central body portion 29 and two end rings 30 which are disposed in abutment against the opposite ends of body portion 29. The opposite ends of body portion 29 are provided with outwardly projecting annular flanges 31 against which rings 30 abut to define therebetween an annular cavity 37, the purpose of which will be hereinafter explained. Sleeve 28 is dimensioned in length to fit between shoulders 17 of piston sections 13 and 14 and to be held securely by shoulders 17 when nut 23 is turned tight upon piston rod 22. Sleeve 28 is dimensioned in thickness such that, when the sleeve is in abutment against seats 18, the outer peripheral surface of sleeve 28 projects a substantial distance beyond the outer peripheral surface of sections 13 and 14 of the piston body.

Sleeve 28, body portion 29, and rings 30 are composed of non-metallic material having self-lubricating properties, preferably graphitized carbon since this material is relatively inexpensive, and has a relatively low coefficient of expansion. Since material such as Teflon is expensive and has a high coefficient of expansion, it is not, therefore, economically desirable nor structurally feasible to construct the entire sleeve of Teflon. Accordingly, body portion 29 of sleeve 28 is provided with an annular groove 32 in which is disposed a wear ring 33 composed of non-metallic material having self-lubricating characteristics as well as a higher resistance to wear than graphitized carbon, such as Teflon. The wear ring 33 is dimensioned so that, when it is secured within groove 32 by suitable means, such as by shrinking or bonding, the outer peripheral surface of the wear ring projects beyond the outer peripheral surface of the sleeve to hold the latter surface in spaced relationship to the surface of cylinder bore 11. The wear ring 33 may also be of the free floating ring type which is free to rotate with groove 32 and is readily replaceable.

In each cavity 37 is disposed a seal ring 24 which is biased in a direction outwardly toward cylinder bore 11 by a piston ring spring and expander ring 35 which is composed of a flat resilient metal ring. As illustrated, each end ring 30 of sleeve 28 is provided with an annular flange 36 adjacent the outer peripheral surface thereof. The distal end of flange 36 defines with the opposite wall of the cavity a narrow opening in which is slidably disposed seal ring 34. Flange 36 also functions as a stop to prevent piston ring spring 35 from leaving cavity 37 if the seal ring 34 disintegrates or leaves cavity 37.

The seal rings 34 are composed of non-metallic material having self-lubricating characteristics as well as a high resistance to wear compared with graphitized carbon, as for example Teflon, particularly when exposed to certain dry gases and gases having a humidity of below 10° F.

During the operation of piston 10 and its reciprocation in cylinder bore 11 by means of a prime mover (not shown) to which piston rod 22 is connected, the outer peripheral surfaces of wear ring 33 and seal rings 34 will undergo gradual attrition until the outer surface of wear ring 33 becomes flush with the outer surface of sleeve 28. Simultaneously seal rings 34 will experience wear. Thereafter, continued operation of the piston will cause further wear of wear ring 33 and seal rings 34 as well as sleeve 28. Since the sleeve, wear ring, and seal rings are composed of non-metallic material having self-lubricating characteristics, no metal to metal contact will occur by which a spark may occur. Long before sufficient wear to wear ring 33, seal rings 34, and sleeve 28 occurs resulting in the outer peripheral surface of sections 13 and 14 of piston contacting cylinder bore 11, the operator will be alerted to the need for replacement of those components by the reduction in efficiency of the unit resulting from the ineffectiveness of rings 34 to achieve sealing. Thus, replacement of wear ring 33, seal rings 34, and sleeve 28, can be made before any possibility of metal to metal contact between the piston body and cylinder bore 11.

Removal of a worn wear ring 33, seal rings 34, and sleeve 28 and their replacement can be quickly and easily accomplished by merely removing the piston from the cylinder bore and loosening nut 23, separating sections 13 and 14, and removing the worn members. Thereafter, the replacement members may be positioned on seats 18 between shoulders 17 of sections 13 and 14 and the nut 23 retightened to draw the piston's components together as a single unitary structure.

Since in a piston disposed for horizontal reciprocation the attrition of wear ring 33, seal rings 34, and sleeve 28 will be greatest along their bottom peripheral surfaces, it is only necessary to loosen nut 23 and rotate sleeve 28 relative to the piston body to bring the less worn surfaces of wear ring 33, seal rings 34, and sleeve 28 adjacent the lower periphery of the cylinder bore to thereby provide the unit with a longer operative life. If a free floating wear ring 33 is employed in the piston, the effectiveness of the wear ring may be restored by merely rotating the wear ring within groove 32.

It is believed from the foregoing description that it is readily apparent that a novel non-lubricated piston has been provided which is particularly adapted for mechanisms such as compressors and pumps employed to handle combustible fluids and/or dry gases. It is also believed clear that an improved non-lubricated piston has been provided which is of relatively simple construction and wherein seal rings and/or wear rings may be quickly and easily replaced. The invention, in addition, provides a non-lubricated piston wherein metal to metal contact and sparking cannot occur during the normal operative life of the seal rings and/or wear rings.

Although but one embodiment of the invention has been illustrated and described in detail, it is to be expressly understood that the invention is not limited thereto. Various changes can be made in the arrangement of parts without departing from the spirit and scope of the invention as the same will now be understood by those skilled in the art.

I claim:

1. A non-lubricated piston disposed for reciprocation in a cylinder bore comprising,
    (a) a piston body having an outside diameter less than that of the cylinder bore so that the peripheral surface of said piston body is spaced from the surface of the cylinder bore,
    (b) an annular recess in the peripheral surface of the piston body extending slightly less than the full width of the piston body,
    (c) a sleeve means composed of non-metallic material disposed in said recess and dimensioned so as to project beyond the peripheral surface of said piston body, and
    (d) at least one seal ring composed of non-metallic material having a high resistance to wear and self-lubricating characteristics carried by said sleeve and biased outwardly so that its outer peripheral surface projects beyond the peripheral surface of said sleeve and in engagement with the surface of the cylinder bore.

2. A non-lubricated piston disposed for reciprocation in a cylinder bore comprising,
    (a) a piston body having an outside diameter less than that of the cylinder bore so that the peripheral surface thereof is spaced from the surface of the cylinder bore,
    (b) an annular recess in the peripheral surface of the piston body extending slightly less than the full width of the piston body,
    (c) a cylindrical sleeve composed of non-metallic material secured in said recess and dimensioned so that its outer peripheral surface lies beyond the peripheral surface of the piston body and spaced from the surface of the cylinder bore,
    (d) at least one wear ring of non-metallic material having a high resistance to wear and self-lubricating characteristics supported by said sleeve so that the outer peripheral surface of the wear ring lies beyond the outer peripheral surface of said sleeve, and
    (e) at least one seal ring of non-metallic material having a high resistance to wear and self-lubricating characteristics carried by said sleeve,
    (f) said seal ring being biased outwardly so that its outer peripheral surface lies beyond the outer surface of said sleeve and constantly engages the surface of said bore.

3. The piston of claim 2 wherein said sleeve is composed of graphitized carbon and the wear ring and seal ring are composed of tetrafluoroethylene resin.

4. A non-lubricated piston disposed for reciprocation in a cylinder bore comprising,
    (a) a piston body having an outside diameter less than that of the cylinder bore so that the peripheral surface thereof is spaced from the surface of the cylinder bore,
    (b) an annular recess in the peripheral surface of the piston body extending substantially the full length of the piston body,
    (c) a cylindrical sleeve composed of non-metallic material secured in said recess and dimensioned so that its outer peripheral surface lies beyond the peripheral surface of the piston body and spaced from the surface of the cylinder bore,
    (d) at least one wear ring of non-metallic material having a high resistance to wear and self-lubricating characteristics supported by said sleeve so that the outer peripheral surface of the wear ring lies beyond the outer peripheral surface of said sleeve, (e) at least one piston ring groove in said sleeve, (f) a seal ring of non-metallic material having a high resistance to wear and self-lubricating characteristics disposed in said piston groove, and (g) means in said piston groove for outwardly biasing said seal ring so that the outer peripheral surface of the seal ring lies beyond the outer peripheral surface of the sleeve and in contact with the surface of the cylinder bore.

5. A non-lubricated piston disposed for reciprocation in a cylinder bore comprising, (a) a piston body having an outside diameter less than that of the cylinder bore so that the peripheral surface of the piston is spaced from the surface of the cylinder bore, (b) a piston rod connected at one end to said piston body and at the opposite end to a prime mover for reciprocation of the piston body, (c) said piston body comprising two similar sections secured together by said piston rod, (d) each of said sections having a central boss extending coaxially with said piston rod and an annular flange spaced from the outer periphery of the section and extending coaxially with said central boss to define a seat and a shoulder, (e) a sleeve of non-metallic material disposed on the seats and between the shoulders of said piston body sections, (f) said sleeve being dimensioned so that the outer periphery thereof lies beyond the peripheral surface of the piston sections and spaced from the surface of the cylinder bore, (g) at least one wear ring of non-metallic material having a high resistance to wear and self-lubricating characteristics supported by said sleeve so that the outer peripheral surface of the wear ring lies beyond the outer peripheral surface of the sleeve, and (h) at least one seal ring of non-metallic material having a high resistance to wear and self-lubricating characteristics slidably carried by said sleeve, (i) said seal ring being biased outwardly so that its outer peripheral surface lies beyond the outer peripheral surface of said sleeve and in engagement with the surface of said cylinder bore.

6. A non-lubricated piston disposed for reciprocation in a cylinder bore comprising, (a) a piston body constructed of two abutting sections, (b) each of the sections having an integral hub portion and an annular flange spaced inwardly from the outer peripheral surface of the section and extending in coaxial relationship with the hub portion to form a seat and a shoulder, (c) a piston rod having a reduced diameter end portion and a stop shoulder defined thereby, (d) said piston body sections having aligned bores to receive therethrough the reduced diameter end portion of said piston rod, (e) a sleeve of non-metallic material disposed on the seats and between the shoulders of the piston body sections, (f) said sleeve being dimensioned so that the outer peripheral surface thereof lies beyond the outer peripheral surface of the piston body sections and spaced from the surface of the cylinder bore, (g) means cooperating with the piston rod and the stop shoulder of the latter to secure the piston body sections in tight abutment against each other and the shoulders of the sections in tight abutment against the opposite ends of the sleeve, (h) at least one wear ring of non-metallic material having a high resistance to wear and self-lubricating characteristics supported by said sleeve so that the outer peripheral surface of the wear ring lies beyond the outer peripheral surface of the sleeve, and (i) at least one seal ring of non-metallic material having a high resistance to wear and self-lubricating characteristics slidably carried by said sleeve, (j) said seal ring being biased outwardly so that its outer peripheral surface lies beyond the outer peripheral surface of said sleeve and in engagement with the surface of said cylinder bore.

7. The apparatus of claim 6 wherein means is provided to prevent relative rotary movement between the two piston body sections.

8. A non-lubricated piston disposed for reciprocation in a cylinder bore comprising, (a) a piston body constructed of two abutting sections, (b) each of the sections having a hub portion and an annular flange in relatively close spaced relation to the outer peripheral surface of the section and extending in coaxial relationship with the hub portion to form a seat and a shoulder, (c) said piston body sections having aligned bores extending coaxially with the hubs to receive therethrough one end of a piston rod, (d) a sleeve of non-metallic material disposed on the seats and between the shoulders of the piston body sections, (e) said sleeve being dimensioned so that the outer peripheral surface thereof lies beyond the outer peripheral surface of the piston body sections and spaced from the surface of the cylinder bore, (f) at least one annular recess in the outer peripheral surface of said sleeve, (g) a wear ring of non-metallic material having a high resistance to wear and self-lubricating characteristics secured within said annular recess and dimensioned so that the outer peripheral surface of the wear ring lies beyond the outer peripheral surface of the sleeve, (h) at least one other annular recess in the outer peripheral surface of said sleeve, (i) a seal ring of non-metallic material having a high resistance to wear and self-lubricating characteristics disposed in said other annular recess for slidable movement normal to the axis of the piston body, (j) means disposed in said other annular recess to bias said seal ring outwardly so that the outer peripheral surface thereof lies beyond the outer peripheral surface of the sleeve and in contact with the surface of the cylinder bore, and (k) means cooperating with the piston rod to clamp the piston body sections and the sleeve together as a unitary assembly.

References Cited in the file of this patent

UNITED STATES PATENTS

| | | |
|---|---|---|
| 2,068,859 | Jones | Jan. 26, 1937 |
| 2,460,948 | Sander | Feb. 8, 1949 |
| 2,736,625 | Naab | Feb. 28, 1956 |
| 2,763,089 | Anderson | May 21, 1957 |